United States Patent [19]
Jeong

[11] Patent Number: 5,832,064
[45] Date of Patent: Nov. 3, 1998

[54] MASS CALLING PROCESSING METHOD FOR TELEVOTING SERVICE

[75] Inventor: Kwang-Tae Jeong, Daejeon, Rep. of Korea

[73] Assignees: Electronics and Telecomunications Research Institute, Daejeon; Korea Telecom, Seoul, both of Rep. of Korea

[21] Appl. No.: 822,142

[22] Filed: Mar. 17, 1997

[30] Foreign Application Priority Data

May 30, 1996 [KR] Rep. of Korea .................. 1996-18814

[51] Int. Cl.[6] .................................................. H04M 11/00
[52] U.S. Cl. ........................................ 379/92.02; 379/207
[58] Field of Search ............................. 379/92.01–92.04, 379/112, 113, 207; 348/1; 455/2

[56] References Cited

U.S. PATENT DOCUMENTS 5,675,635  10/1997  Vos et al. .............................. 379/92.03

FOREIGN PATENT DOCUMENTS 0 265817   5/1988   European Pat. Off. .
WO 89/09525  10/1989  WIPO .
WO 93/23962  11/1993  WIPO .
WO 94/23543  10/1994  WIPO .

*Primary Examiner*—Wing F. Chan
*Attorney, Agent, or Firm*—Jacobson, Price, Holman & Stern, PLLC

[57] ABSTRACT

An improved mass calling processing method for a televoting service by which it is possible to prevent a signal traffic jam by processing an intelligent network call without a SCP request when a mass calling occurs in the intelligent network including a SSP, STP, SCP, and IP which are components of the intelligent network, which includes a third step (300 thorough 312) for connecting the bear channel when the IP receives a leading address message from the SSP for connecting the bear channel, receiving an additional information request message from the SSP when the filtered call flag of the leading address message received from the SSP is true, transferring an information answer, gathering the number of digits, transferring the additional information message to the SSP, and releasing the connection of the bear channel when the connection release request message is received from the SSP wherein the mass calling processing method for a televoting service, wherein there are provided a service control point (SCP), a service management system (SMS), a signalling transfer point (STP), a service switching point (SSP), an intelligent peripheral (IP), a local exchange (LE) in an intelligent network and an extended service filtering technique.

9 Claims, 5 Drawing Sheets

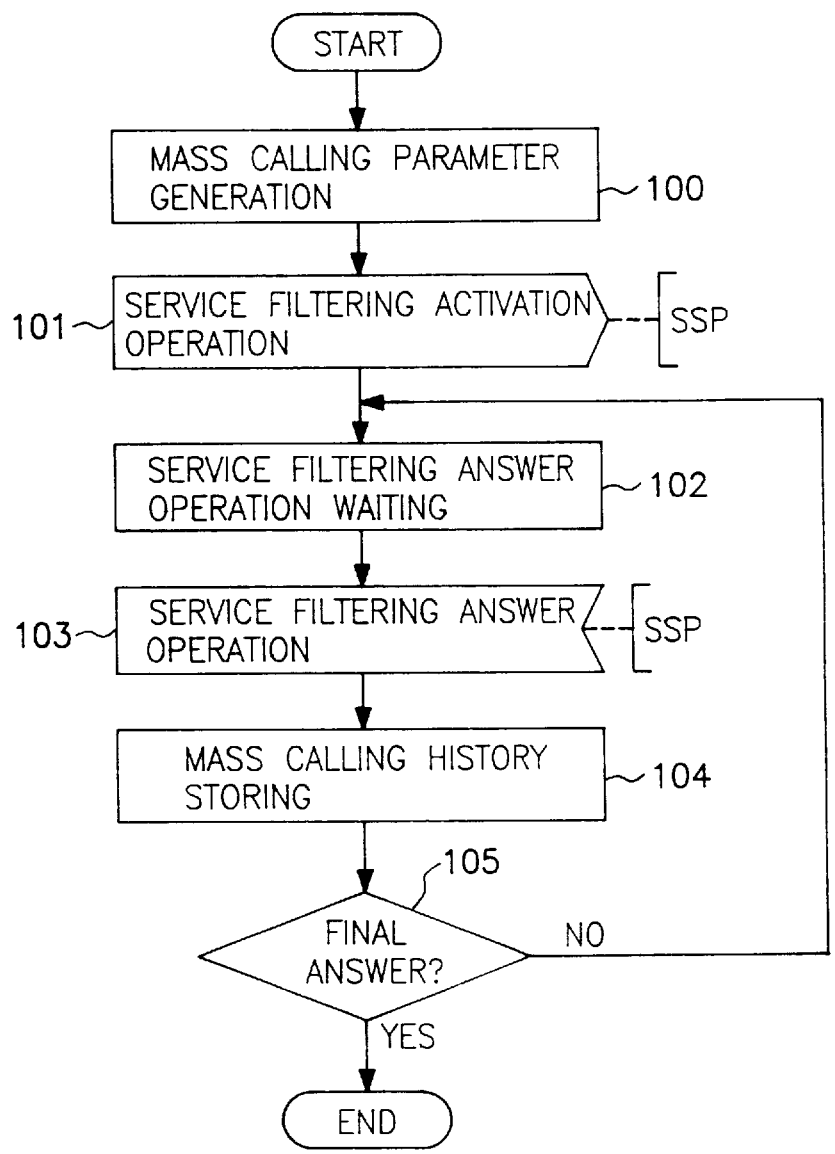

MASS CALLING PROCESSING METHOD FOR TELEVOTING SERVICE

BACKGROUND OF THE INVENTION

1. Field of the Invention

The present invention relates to a mass calling processing method for a televoting service, and particularly, to an improved mass calling processing method for a televoting service which is capable of using an extended service filtering technique in cooperation with an intelligent type information provider system.

2. Description of the Conventional Art

As telecommunication technique advances, an intelligent network has been intensively studied. Thesedays, the a intelligent network is used in the industry; however, the technique thereof is at an initial stage. As the number of communication users are significantly increased, various kinds of the intelligent network services must be provided. In addition, the intelligent network technique significantly advances from the initial stage to a high level intelligent network. The standardization with respect to the intelligent network has been processed in the International Telecommunication Union—Telecommunication Standardization Sector (ITU-T).

In the case of the televoting service (VOT) and a mass calling (MAS) service, there is a characteristic that a mass calling is concentrated at a time within a few seconds after the start of the VOT and MAS. In particular, due to the concentration of mass call in the VOT/MAS service which is provided by the interrelationship with the intelligent peripheral (IP) system, there occurs a heavy signal traffic jam between nodes, namely, between the service control point (SCP) and the service switching point (SSP), and the SCP and the IP.

In the conventional mass calling processing method using a call blocking operation or a service filtering activation operation, it was possible to process the mass calling processing with respect to the VOT/MAS in which there is not a specific interrelationship with the IP. Namely, the SCP provides the SSP with a part of service logic thereof, and the SSP having the service logic of the SCP processes the called signal through a specific service or a specific called side without a question of the SCP, so that it is possible to process the mass calling which improves the signal traffic between the SCP and SSP.

In the case that a large of intelligent networks in the conventional art does not use the IP having a specific source, it is possible to process a large amount of intelligent network calls without a question of the SCP.

However, in the case that the VOT/MAS service which is provided by using the specific source such as an information answer from the IP, a dual tone multi-frequency (DTMF), etc, it is impossible to process a mass calling with respect to the VOT/MAS.

SUMMARY OF THE INVENTION

Accordingly, it is an object of the present invention to provide an improved mass calling processing method for a televoting which overcome the problems encountered in the conventional art.

It is another object of the present invention to provide an improved mass calling processing method for a televoting service by which it is possible to use an extended service filtering technique in cooperation with an intelligent type information provider system.

It is another object of the present invention to provide an improved mass calling processing method for a televoting service by which it is possible to prevent a signal traffic jam by processing an intelligent network call without an SCP request when a mass calling occurs in the intelligent network including an SSP, STP, SCP, and IP which are components of the intelligent network.

To achieve the above objects, there is provided an improved mass calling processing method for a televoting service which includes the steps of a first step (100 through 105) for transferring a service filtering activation operation to the SSP so as to process a mass calling after the SCP generates a mass calling parameter, receiving a service filtering response operation from the SSP in a state that the service filtering response operation is in the receiving ready mode, and storing the mass calling history, a second step (200 through 224) for storing the filtering parameter in the service filtering activation operation in the SSP data base after the SSP 4 receives the service filtering activation operation from the SCP, starting the service filtering, receiving the intelligent network call from a local exchange and an additional information message from the IP by using the filtering reference parameter stored in the SSP database and by connecting an IP routing information when the mass calling is generated, storing the mass calling history in the SSP database, releasing the bearer channel, reporting the history with respect to the intelligent network call filtered at every a specific interval or a received call number to the service filtering response operation after releasing the bearer channel, and for carrying the final history on the filtering response operation and transferring to the SCP when the service filter is terminated, and a third step (300 thorough 312) for connecting the bear channel when the IP receives a leading address message from the SSP for connecting the bear channel, receiving an additional information request message from the SSP when the filtered call flag of the leading address message received from the SSP is true, transferring an information answer, gathering the number of digits, transferring the additional information message to the SSP, and releasing the connection of the bear channel when the connection release request message is received from the SSP wherein the mass calling processing method for a televoting service, wherein there are provided a service control point (SCP), a service management system (SMS), a signalling transfer point (STP), a service switching point (SSP), an intelligent peripheral (IP), a local exchange (LE) in an intelligent network and an extended service filtering technique.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a flow chart so as to explain a mass calling processing based on an SCP (Service Control Point) for a televoting according to the present invention;

DETAILED DESCRIPTION OF THE INVENTION

Figure 1:
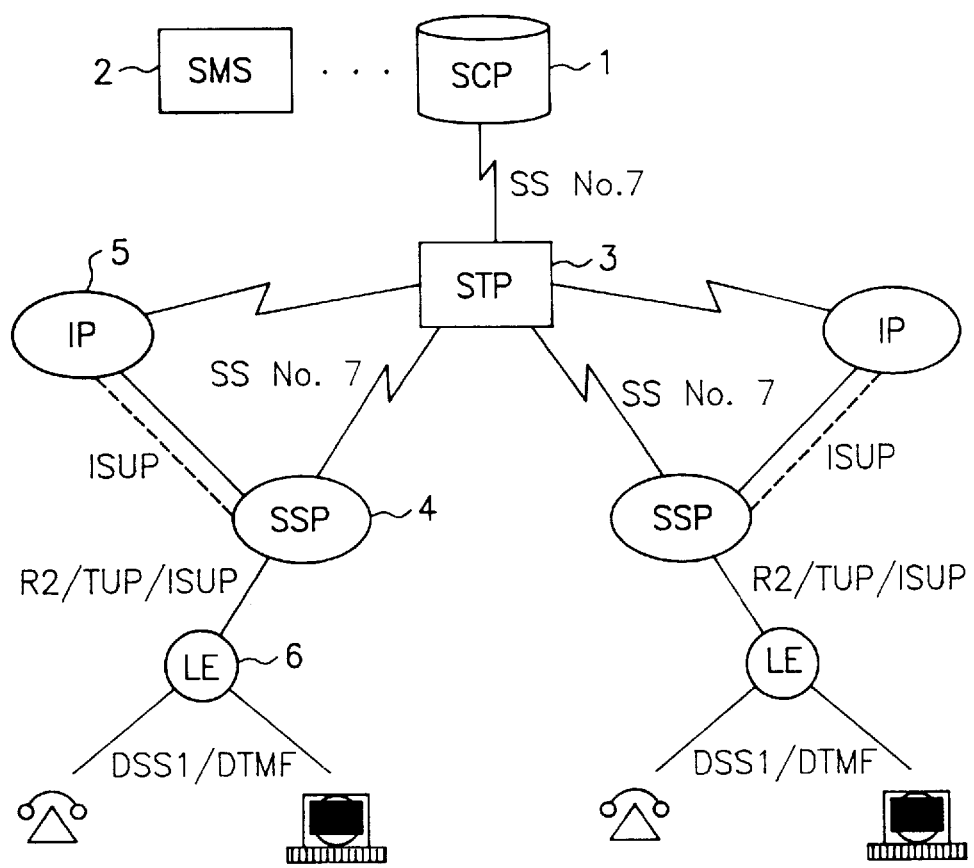
FIG. 1 is a view illustrating an intelligent network according to the present invention.

FIG. 1 is a view illustrating an intelligent network according to the present invention.

In the drawings, reference numeral 1 denotes a service control point (SCP), 2 denotes a service management system (SMS), 3 denotes a signaling transfer point (STP), 4 denotes a service switching point (SSP), 5 denotes an intelligent peripheral, and 6 denotes a local exchange (LE).

The intelligent network according to the present invention includes the SSP 4, the SCP 1, the IP 5, the SMS 2, the LE 51, and the STP 3.

The SCP 1 directly controls the source of the IP 5 for a signalling between the SSP 4, the SCP 1 and the IP 5. The IP 5 has various sources such as an information answer function, an audio recognition function, an audio mixing function, etc so that a service user can conveniently use the service, gathers an additional information from the service user and offers an information with respect to the incomplete call, and has a specific source for providing the VOT/MAS service.

The SSF 4 recognizes the VOT/MAS service request from the service user, triggers a corresponding service logic, request a service processing to the SCP 1, relays the service between the service user and the SCP 1, and performs the routing function to the IP 5.

The SSP 4 of the intelligent network according to the present invention processes the intelligent network service request from a local exchange 6 on the assumption that the service is referred to a tool service, not to the local service. In addition, the SCP 1 processes and controls the VOT/MAS service by using data which are necessary for the service logic and the service providing process.

The IP 5 has a network source related to the service processing, receives a control of the SCP 1, provides the service user with the network source, gathers an input data from the service user, and stores the gathered input data.

In addition, the SMS 2 is operated by a network operator and performs a management function for changing the data and logic which are necessary for performing the service, and the STP 3 performs a function for transferring a No. 7 operation service of a signaling system between the SCP 1 and the SSP 4. Namely, the signalling method between the SSP 4 and the SCP 1 is directed to providing and receiving the operation signal by using the SS No. 7, and a connection signalling method between the SSP 4 and the IP 5 is directed to providing and receiving the operation signal by using the SS No. 7 ISUP (ISDN user part).

In addition, the signalling method between the SSP 4 and the LE 6 is directed to using R2, a telephone user part, an ISDN user part (ISUP), etc, and the signaling method between the telephone network subscriber and the LE 6 is directed to using a DSS1 or a dual tone multi-frequency (DTNF).

The operation of the mass calling processing method for a televoting service according to the present invention will now be explained.

In the mass calling of the high level intelligent network, in order to process the heavy signal traffic between the SSP 4 and the SCP 1 within a few seconds after the service is started, the SCP 1 provides the SSP 4 and the IP 5 with the service logic, and the SSP 4 and the IP 5 processes the mass calling without the request of the SCP 1 in accordance with the corresponding service logic.

The SCP 1 provides the SSP 4 with the service logic by using a service filtering activation operation. The SSP 4 received the operation processes a mass intelligent calling without the request of the SCP 1 in accordance with the parameter indicated in the received operation signal, and stores a call history, a counter value, etc into the SSP database. In addition, the history with respect to the intelligent network which is processed at every specific interval and call is carried on a filtering response operation and reports to the SCP 1. When the service filtering is terminated, namely, the mass calling processing is terminated, the SSP 4 reports the final result to the SCP 1, and deletes the service logic stored in the SSP database. The service filtering activation operation for transferring to the SSP 4 includes a filtered call processing, a filtering billing characteristic, a filtering time, a filtering reference, a filtering start time, etc, and includes a parameter for the mass calling processing. The IP 5 requests the auxiliary command information to the SSP 4 without transferring the auxiliary command request operation to the SCP 1 in the case that the source connection request is issued from the SSP 4, and the additional information field in the received leading address message, namely, the filtered call flag is true, and the information answer and digit gathering are performed by using the parameter of the received additional information message.

FIG. 2 is a flow chart so as to explain a mass calling processing based on an SCP (Service Control Point) for a televoting according to the present invention.

The SCP 1 performs the mass calling processing so as to prevent an overload of the SCP 1 or the heavy traffic jam in accordance with the request from the communication subscriber or the service subscriber when a mass calling occurs with respect to the specific called side or the specific service.

The SCP 1 generates a service filtering activation operation including a mass calling parameter such as a filtered call processing, a filtering characteristic, a filtering time, a filtering reference, a filtering start time, etc in step 100. Here, the filtering denotes that the SSP 4 processes the call without a request to the SCP 1 with respect to the specific called side or the specific service. Namely, the SCP 1 provides the SSP 4 with the service logic by using the SS No. 7 signal, and the SSP performs the call processing without a request to the SCP 1.

The filtered call processing parameter includes an IP routing address indicating the IP routing address, a filtering billing characteristic indicating the billing characteristic with respect to the filtered call, a processing information with respect to the filtered call, namely, the transfer information indicating a tone, an information answer, etc, the maximum counter number indicating the number of called destination included in the filtering, a release cause indicating the releasing cause with respect to the filtered call, a gathering information which the IP must gather, and an IP connection release blocking indicating the connection release state of the IP.

The filtering characteristic parameter is the information which indicates whether the filtering of the SSP 4 is performed based on the interval or the number of trials. The filtering time parameter is the information regarding how long the service filtering is performed. The filtering reference parameter is the information indicating that the SSP 4 must perform the filtering with respect a predetermined object and includes an input number, a calling subscriber number, a service key, and an address and service (a service key, a called address value, a calling address value, and a location number). The service starting parameter denotes the time when the filtering is started with respect to the mass calling.

All the mass calling processing parameter is generated in step 100. The mass calling processing parameter is included in the service filtering activation operation so as to request the mass calling processing to the SSP, and is transferred to the SSP 4 in step 101.

After the service filtering activation operation is transferred, the operation of the service filtering response from the SSP 4 is in a ready mode in step 102, and when the service filtering response operation is received from the SSP 4 in step 103, the result of the filtering performed by the SSP 4 is store in the database in step 104. Namely, the counter value, and a filtered call history with respect to the mass calling are stored. The service filtering response operation includes a counter value with respect to the filtered call, a filtering reference so as to drive the service logic of the SCP 1, and an answer condition indicating a final answer or an intermediate answer.

In addition, it is judged that whether the answer condition of the service filtering response operation is the final answer or not in step 105. If the answer condition is the final answer, all the mass calling is terminated, and if the answer condition is not the final answer, the service filtering response operation is in the ready mode until the final answer is received in step 102.

Figure 3A:
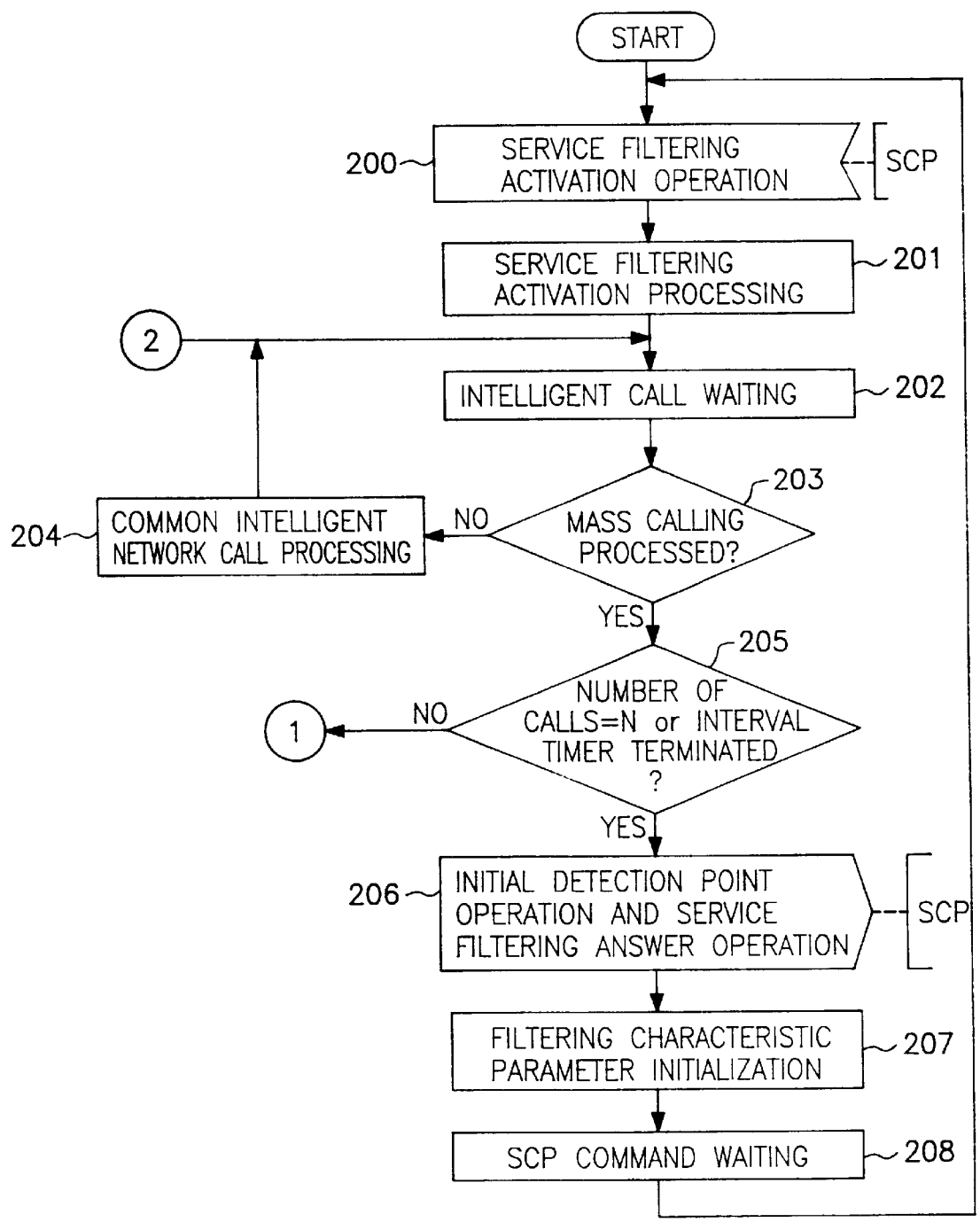
FIGS. 3A and 3B are flow charts so as to explain a mass calling processing based on an SSP (Service Switching Point) for a televoting according to the present invention.
Figure 3B:
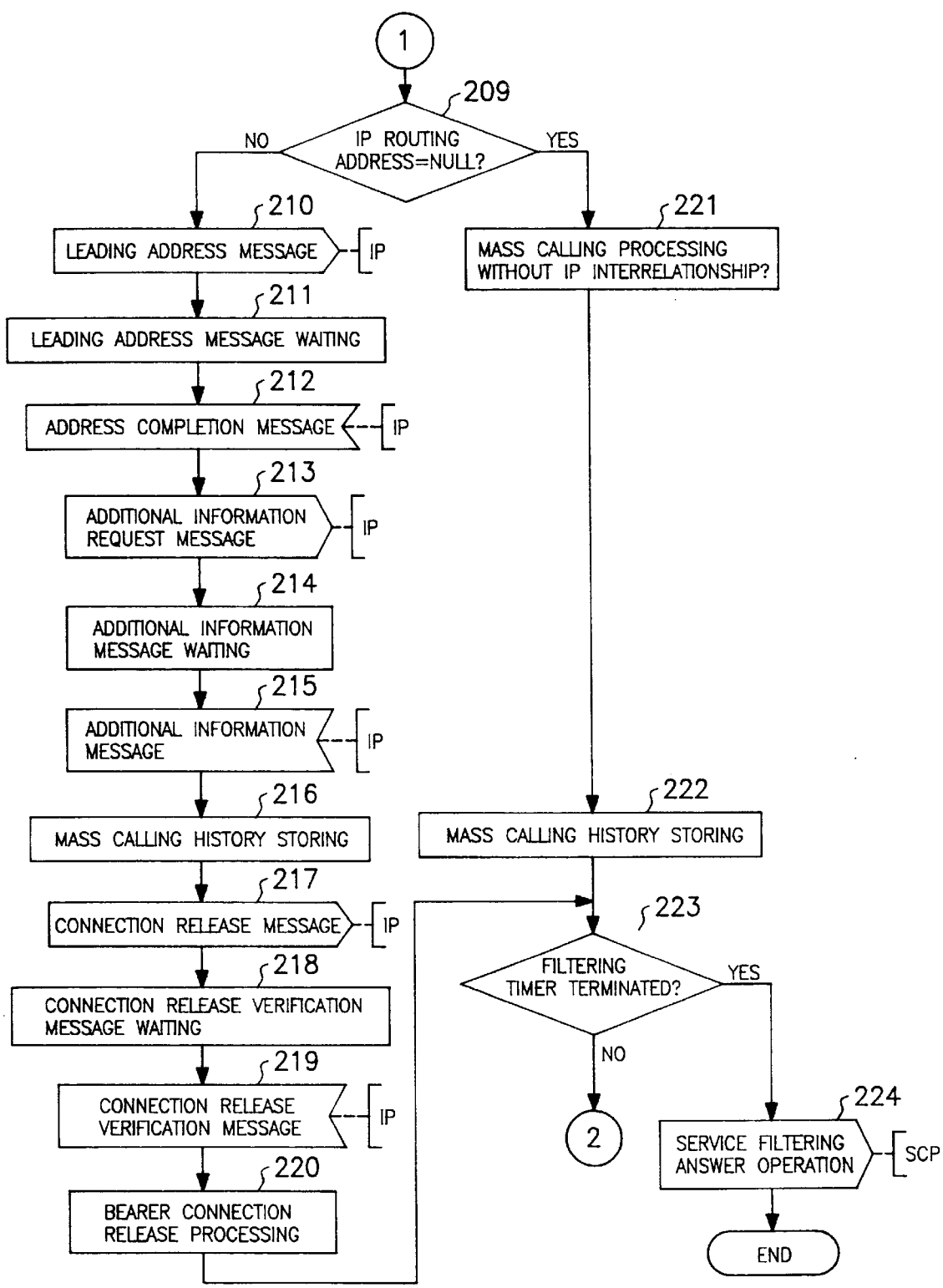

FIGS. 3A and 3B are flow charts so as to explain a mass calling processing based on a SSP (Service Switching Point) for a televoting according to the present invention.

When the SSP 4 receives the service filtering activation operation from the SCP 1 in step 200, the filtering parameter contained in the service filtering activation operation is stored in the SSP database, and the service filtering activation processing, namely, the service filtering is started in step 201.

The SSP waits until the intelligent call is received from the local exchange LE 5 in step 202. When the intelligent call is received, it is judged whether the mass calling processing is performed by using the filtering reference parameter stored in the SSP database in step 203.

If it is not referred to the mass calling processing, the common intelligent call process is performed in step 204, and if it is referred to the mass calling processing, it is judged whether the interval timer for verifying the number of received calls is referred to a predetermined number "N" or a predetermined amount of data interval in step 205.

If the number of calls is "N" or the interval timer is terminated, the SSP 4 transfers the initial detection operation and service filtering response operation to the SCP in step 206, and the filtering characteristic parameter is initialized in step 207, and then the routine is shifted to the ready mode so as to receive a predetermined command signal from the SCP in step 208.

If the number of calls is not "N", or the interval timer is not terminated, it is judged whether the IP routing address is a null value in step 209. If the IP routing address in the filtered call processing parameter for the mass calling processing is not a null value, the filtered call flag is set to true, and then is carried on the leading address message, and transferred to the IP 5 in step 210, and the routine becomes a ready mode until the leading address completion message is received from the IP 5 in step 211.

When the leading address completion message is received from the IP 5, and a bearer channel is connected between the SSP 4 and the IP5 in step 212, the SSP 4 carries a transfer information, a gathering information, and an IP connection releasing blocking on the additional request message and transfers to the IP 9 in step 213, the routine becomes a read mode until the additional information message which is the information gathering result report of the IP 5 is received in step 214.

When the additional information message is received from the IP 5 in step 215, the SSP 4 stores the mass calling history in the database in step 216, and the connection release message is transferred to the IP 5 for the bearer channel connection release in step 217, and the routine becomes a ready mode until the connection release verification message is received from the IP 5 in step 218.

When the connection release verification message is received from the IP 5 in step 219, and the connection state of the bearer channel with the IP is released in step 220, and it is judged whether the filtering time timer is terminated in step 223.

If the IP routing address is null in step 209, the SSP 4 performs the mass calling processing in which there is not an IP interrelationship with respect the received mass calling in step 221, and the mass calling history is stored in the SSP database in step 222, and it is judged whether the filtering time timer is terminated in step 223.

If the filtering time timer was not terminated, the routine becomes a ready mode so as to receive the intelligent network call in step 202, and if the filtering time timer is terminated, the final answer is indicated in the filtering response operation and is transferred to the SCP 1 in step 224, and then the mass calling processing is terminated.

Figure 4:
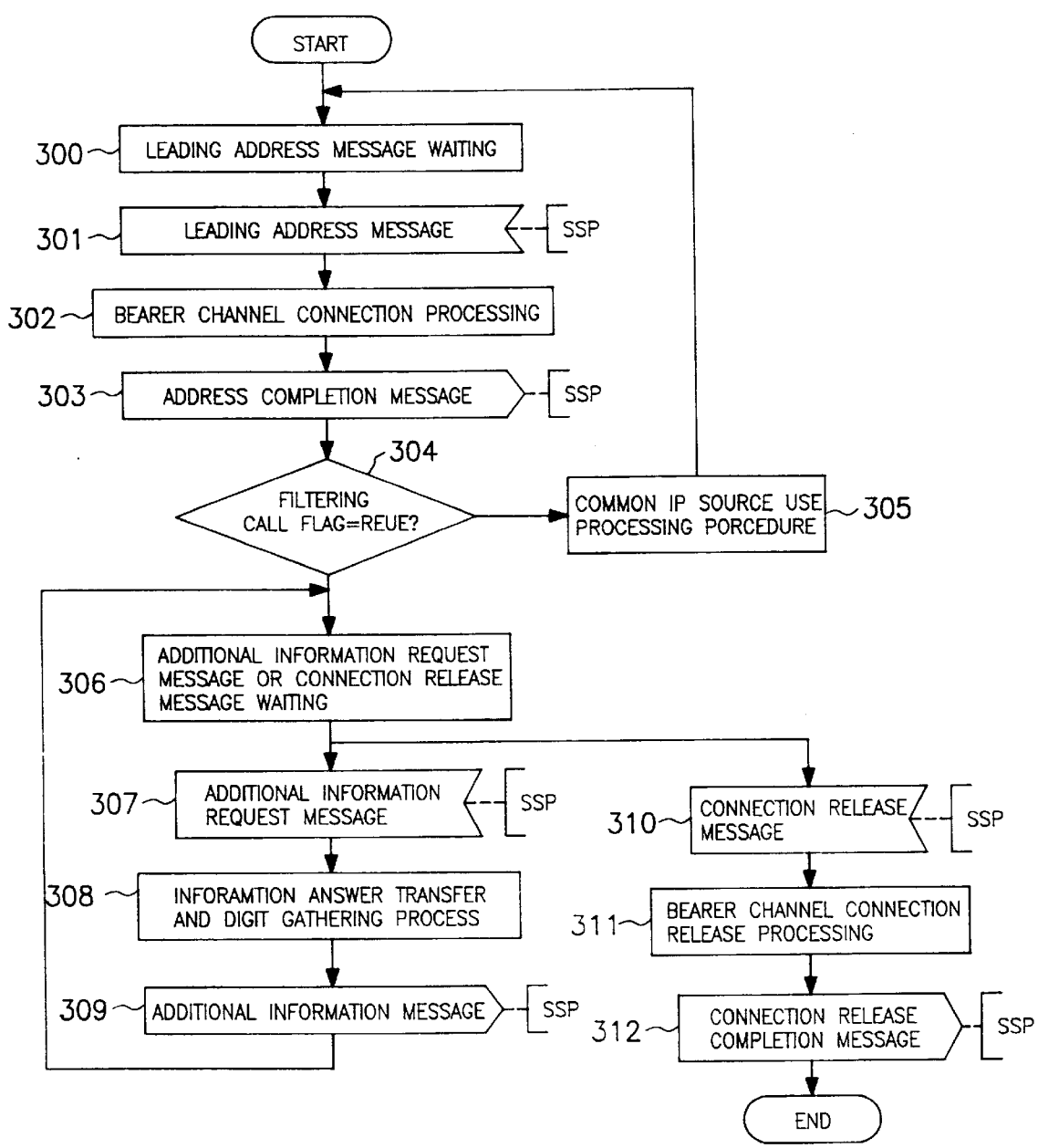
FIG. 4 is a flow chart so as to explain a mass calling processing based on an IP (Intelligent Peripheral) for a televoting according to the present invention.

FIG. 4 is a flow chart so as to explain a mass calling processing based on an IP (Intelligent Peripheral) for a televoting according to the present invention.

As shown therein, the IP 5 becomes a ready mode so as to receive the leading address message from the SSP 4 for a bear channel connection in step 300, and if the leading address message is received from the SSP 4 in step 301, the bearer channel is connected in step 302, and the address completion message which is an answer message with respect to the connection of the bear channel is transferred to the SSP 4 in step 303.

In addition, the filtered call flag in the received leading address message is judged to be true in step 304. As a result, the filtered call flag is false, the common IP source use process is performed in step 305, and if the filtered call flag is true, the routine becomes a ready mode until the additional information request message or the connection release message is received from the SSP 4 in step 306.

If the additional information request message is received from the SSP 4 in step 307, the information answer and digit are gathered in accordance with the transfer information, the gathering information, and the IP connection release blocking in the additional information request message.

When the digit gathering is terminated, the gathered digit information is carried on the additional information message and is transferred to the SSP 4 in step 309, and the steps after the 306 which becomes a ready mode until the additional information request message or the connection releaser message is received from the SSP 4.

In the state that the additional information request message or the connection release message is received in step 306, when the bearer channel connection release message is received from the SSP 4 in step 310, the connection of the bear channel with the SSP 4 is released in step 311, and the bearer channel connection release completion message is transferred to the SSP 4, and the routine is terminated in step 312.

As described above, the mass calling processing method for a televoting service according to the present invention is directed to preventing a signal traffic jam by processing an intelligent network call without an SCP request when a mass calling occurs in the intelligent network including an SSP, STP, SCP, and IP which are components of the intelligent network. In addition, it is possible to provide a large amount of service to a service user by adapting an intelligent network service such as a televoting/mass calling service, and the communication service provider can provide a better communication service, and a quality communication service at lower cost. Moreover, it is possible to prevent the phenomenon that other intelligent network service is terminated due to the heavy signal traffic, for thus improving other intelligent network service and service.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A mass calling processing method for a televoting service, wherein there are provided a service control point (SCP), a service management system (SMS), a signalling transfer point (STP), a service switching point (SSP), an intelligent peripheral (IP), a local exchange (LE) in an intelligent network and an extended service filtering technique is adapted therefor and an interrelationship with the IP, comprising the steps of:

a first step (100 through 105) for transferring a service filtering activation operation to the SSP so as to process a mass calling after the SCP generates a mass calling parameter, receiving a service filtering response operation from the SSP in a state that the service filtering response operation is in the receiving ready mode, and storing the mass calling history;

a second step (200 through 224) for storing the filtering parameter in the service filtering activation operation in the SSP data base after the SSP 4 receives the service filtering activation operation from the SCP, starting the service filtering, receiving the intelligent network call from a local exchange and an additional information message from the IP by using the filtering reference parameter stored in the SSP database and by connecting an IP routing information when the mass calling is generated, storing the mass calling history in the SSP database, releasing the bearer channel, reporting the history with respect to the intelligent network call filtered at every a specific interval or a received call number to the service filtering response operation after releasing the bearer channel, and for carrying the final history on the filtering response operation and transferring to the SCP when the service filter is terminated; and a third step (300 thorough 312) for connecting the bear channel when the IP receives a leading address message from the SSP for connecting the bear channel, receiving an additional information request message from the SSP when the filtered call flag of the leading address message received from the SSP is true, transferring an information answer, gathering the number of digits, transferring the additional information message to the SSP, and releasing the connection of the bear channel when the connection release request message is received from the SSP.

2. The method of claim 1, wherein said mass calling parameter in the first step includes a filtered call processing, a filtering characteristic, a filtering time, a filtering reference, and a filtering starting time, wherein an extended service filtering technique is adapted therefor.

3. The method of claim 2, wherein said filtered call processing parameter includes an IP routing address which indicates an IP routing address, a filtering billing characteristic which indicates a billing characteristic with respect to the filtered call, a filtered call processing information, namely, a transferring information indicating a tone, and an information answer, the maximum counter number indicating the number of the called destination included in the filtering, a release cause corresponding to the filtered call, a gathering information gathered by the IP, and an IP connection release blocking of the bear channel of the IP.

4. The method of claim 2, wherein said filtering characteristic parameter includes an information for determining whether an interval is used as a reference or the number of trials is used as the reference when the SSP performs a filtering, wherein an extended service filtering technique is adapted therefor.

5. The method of claim 2, wherein said filtering reference parameter includes an input number, a calling subscriber number, a service key, and an address and service which are information with which the SSP determines which element is proper for the filtering, wherein an extended service filtering technique is adapted therefor.

6. The method of claim 1, wherein a service filtering response operation received from the SSP in the first step (100 through 105) includes a counter value with respect to the filtered call, a filtering reference for driving the service logic of the SCP, and an answer condition which indicates the final answer or intermediate answer, wherein an extended service filtering technique is adapted therefor.

7. The method of claim 1, wherein said second step (200 through 224) includes the steps of:

a fourth step for storing the filtering parameter included in the service filtering activation operation in the SSP database when the SSP receives the service filtering activation operation from the SCP, starting the service filtering, and judging whether the mass calling is processed by using the filtering reference parameter when an intelligent network call is received from the local exchange;

a fifth step (204 and 205) for performing the common intelligent network call process when the routine is not referred to the mass calling processing in step the fourth step (200 through 203), and judging whether the interval timer is terminated so as to whether the number of calls received is referred to a predetermined number "N" or a data interval when the mass calling is provided;

a sixth step (206 through 209) for initializing the filtering characteristic parameter, converting the routine to a ready mode so as to receive the command from the SCP after the SSP transfers the initialize detection point operation and service filtering response operation when the number of the call is not referred to a predetermined number "N" or the interval timer is terminated, and verifying the IP routing address when the number of calls was not referred to a predetermined number "N" or the interval timer was not terminated;

a seventh step (210 through 223) for setting the filtered call flag as a true when the IP routing address is not null in the sixth step (206 through 209), carrying the filtered call flag on the leading address message, transferring to the IP, connecting the bearer channel by receiving an answer from the IP, transferring the additional information request message to the IP, receiving the additional information message from the IP, and releasing the bearer connection by requesting the connection release of the bearer channel after the SSP stores the mass calling history in the SSP database, processing the mass calling with the interrelationship with the IP when the IP routing address i null, storing the mass calling history, and judging whether the filtering timer is terminated; and an eighth step (224) for performing the steps after the steps of waiting the receiving of the intelligent network call in the fourth step (200 thorough 203) when the filtering timer was not terminated in the seventh step (210 through 223), and transferring the service filtering response operation to the SCP when the filtering timer was terminated.

8. The method of claim 7, wherein said seventh step (210 through 223) includes:

a ninth step (210 and 211) for setting the filtered call flag as true when the IP routing address is not null, carrying on the leading address message, transferring to the IP, and waiting until the leading address completion message is received from the IP;

a tenth step (212 through 214) for connecting the bearer channel between the SSP and the IP when the leading address completion message is received from the IP, transferring to the IP after the SSP carries the transfer information, the gathering information, and the IP connection release blocking on the additional information request message, and waiting until the additional information message, which is the information gathering result report message of the IP, is received;

an eleventh step (215 through 218) for receiving the additional information message from the IP, transferring the connecting release message to the IP for the bearer channel connection release after the SSP stores the mass calling history in the database, and waiting until the connection release verification message is received from the IP;

a twelfth step (219, 220, 223) for releasing the connection state of the bearer channel with the IP when the connection release verification message is received from the IP, and verifying whether the filtering timer is terminated; and a thirteenth step (221 through 223) for processing the mass calling without the interrelationship with the IP when the IP routing address is null, storing the mass calling history, and judging whether the filtering timer is terminated, wherein an extended service filtering technique is adapted therefor.

9. The method of claim 1, wherein said third step (300 through 312) includes the steps of:

a fourth step (300 through 304) for connecting a bearer channel when the leading address message is received from the SSP after the IP waits until the leading address message is received from the SSP for the bearer channel connection, transferring the address completion message, which is the verification answer message with respect to the bearer channel, to the SSP, and judging whether the filtered call flag of the received leading address message is true;

a fifth step (305 and 306) for performing the common IP source use processing routine when the filtered call flag is false in the fourth step (300 through 304), and waiting until the additional information request message or the connection release message from the SSP when the filtered call flag is true;

a sixth step (307 through 309) for gathering the information answer transfer and digits in accordance with the transfer information, the gathering information, and the IP connection release blocking included in the additional information request message when the additional information request message is received from the SSP in the fifth step (305 and 306), transferring to the SSP by carrying the gathered digit information of the additional information message after the digit gathering is finished, and waiting until the additional information request message or the connection release message is received from the SSP; and a seventh step (310 through 312) for releasing the bearer channel connection with the SSP when the bearer channel connection release message is received from the SSP in the fifth step (305 and 306) and transferring the bearer channel connection release completion message to the SSP.

\* \* \* \* \*